US008732046B1

(12) United States Patent
Macy et al.

(10) Patent No.: US 8,732,046 B1
(45) Date of Patent: May 20, 2014

(54) METHOD AND SYSTEM FOR CREATING DATA FOR BUSINESS RIGOR MEASUREMENT AND MANAGEMENT OF CAPACITY, COST AND RISK

(75) Inventors: Barbara R Macy, Charlotte, NC (US); Jason David Barnes, Bromley (GB); Michael Scott Goodman, Charlotte, NC (US); Jose Antonio Covaria Martinez, Charlotte, NC (US); Bill Pappas, Charlotte, NC (US); James Peter Michael Purr, Bromley (GB); Charles Elliott Wolter, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 657 days.

(21) Appl. No.: 12/431,333

(22) Filed: Apr. 28, 2009

(51) Int. Cl.
*G06Q 40/00* (2012.01)

(52) U.S. Cl.
USPC .............................................. 705/35; 705/39

(58) Field of Classification Search
CPC ........................................................ G06Q 40/00
USPC ........................................................ 705/35, 38
See application file for complete search history.

(56) References Cited

U.S. PATENT DOCUMENTS

| 7,233,971 | B1 * | 6/2007 | Levy .............................. 709/203 |
| 7,386,466 | B2 * | 6/2008 | McLean et al. ............... 705/7.39 |
| 8,204,809 | B1 * | 6/2012 | Wise ................................. 705/35 |
| 2002/0133368 | A1 * | 9/2002 | Strutt et al. ......................... 705/1 |
| 2009/0192867 | A1 * | 7/2009 | Farooq et al. ................... 705/10 |

* cited by examiner

*Primary Examiner* — Bruce I Ebersman
*Assistant Examiner* — John Anderson
(74) *Attorney, Agent, or Firm* — Michael A. Springs; Moore & Van Allen, PLLC; Nicholas C. Russell

(57) ABSTRACT

A method for managing business rigor for a financial institution includes receiving business rigor data based on activities to implement a plurality of core products. A performance table, unit cost report, and summary report are created or updated based on the business rigor data. The performance table may include data based on an analysis of the business rigor data; the unit cost report may include a cost report based on the performance table data; and the summary report may include a report based on the unit cost report. The summary report is presented in order to improve the business rigor data.

28 Claims, 10 Drawing Sheets

| CORE PROCESS | FUNCTIONS | ACTIVITY # | ACTIVITIES | VOLUME OF TRANSACTIONS PER ACTIVITY | DAILY MINUTES PER ACTIVITY | DAILY VOLUME | TIME PER ITEM / MINS | VALUE STREAM (VA, NVA, BVA, RVA) | ACTIVITY TYPE (EXECUTE / MAINTAIN / GROW) | MINUTES PER DAY SUMMARY |
|---|---|---|---|---|---|---|---|---|---|---|
| A02 (48 %) A03 (30 %) A05 (10 %) A06 (5 %) A08 (2 %) A10 (5 %) | ELECTRONIC REPAIR STAGE 1 | 1 | ACCESS GBS QUEUE MGT | 240 7 FTE, 40 TIMES PER DAY | 2 SECS EACH | 240 | 0.03 | VA | E | 1977.35 |
| | | 2 | SELECT PAYMENT BASED ON WHAT NEEDS TO BE CHANGED/ADDED | 3934 THIS MONTH ON NE-GENEVA | 35 SECS EACH | 1815 | 0.58 | BVA NVA | E | |
| | | 3 | ACTION REPAIR OR PLACE ON HOLD QUEUE AND REFER AS NECESSARY | 34183 THIS MONTH ON OTHER BRANCHES | 30 SECS EACH | | 0.50 | VA | | |
| | | 4 | CHECK COV AND ACTION WHERE | 6 ITEMS PER DAY | 30 SECS EACH | 6 | 0.50 | RVA | | |
| | | 5 | SEE STAGE 1a AND 1b THRU TO VERIFY | | | | | | | |
| | | 6 | | | | | | | | |
| A02 (48 %) A03 (30 %) A05 (10 %) A06 (5 %) A08 (2 %) A10 (5 %) | REFERRAL STAGE 1a | 1 | LOG ON CLIENT SERVICES REFERRAL DATABASE AND SHAREPOINT SIGHT | 28 PER DAY | 3 MINS EACH | 28 | 3 | NVA | E | 244.00 |
| | | 2 | CALL INTERNAL DEPTS EXTERNAL BANKS RE CORRESPONDENT OR CLIENT SERVICES | 32 PER DAY | 5 MINS EACH | 32 | 5 | NVA | | |
| | | 3 | RESPONSE RECEIVED AND ACTION AS APPROPRIATE (PAY/CANCEL/RETURN) | INCLUDED IN REPAIR VOL | | | | VA | | |
| | | 4 | VERIFY ITEM | INCLUDED IN REPAIR VOL | | | | RVA | | |
| A02 (25 %) A03 (75 %) | CLIENT DEVIATIONS - FCP | 1 | CHECK REF DOC RE CLIENT DEVIATIONS | 20 PER DAY | 2 MINS EACH | 20 | 2 | BVA | E | 40.00 |
| A02 (48 %) A03 (30 %) A05 (10 %) A06 (5 %) A08 (2 %) A10 (5 %) | RELEASE 1b | 1 | ACCESS GBS QUEUE MGT | 120 4 FTE, 40 TIMES PER DAY | 2 SECS EACH | 120 | 0.03 | BVA | E | 1201.08 |
| | | 2 | SELECT PAYMENT BASED ON PRIORITY | 4149 THIS MONTH ON NE-GENEVA | 15 SECS EACH | 1780.62 | 0.25 | BVA NVA | | |
| | | 3 | PERFORM SIGHT VERIFICATION (SEE RELEASE 1a) | 33244 THIS MONTH ON OTHER BRANCHES | 25 SECS EACH | | 0.42 | NVA | | |
| | | 4 | APPROVE OR REPAIR IF AN ERROR (RETURNING TO STAGE 1) | 5 PER DAY | 2 MINS EACH | 5 | 2 | VA | | |
| | | 5 | LOG ERROR | | 1 MIN EACH | | 0.5 | RVA | | |
| D09 | OFAC (ADDITIONAL STEPS) | 2 | PRINT OFF AN OFAC AFFECTED ADS | 2 PER DAY | 30 SECS EACH | 2 | | NVA | E | 13.00 |
| | | 3 | GIVE TO OFAC CO-ORDINATOR | | 3 MINS EACH | | 3 | NVA | | |
| | | 4 | OFAC CO-ORDINATOR CHECKS GENI APPROVE OR REFER TO AUDIT | | 1 MIN EACH | | | NVA | | |
| | | 5 | PRINT AND FILE | | 1 MIN EACH | | | RVA | | |
| C04 | AOC (ADDITIONAL STEPS) | 1 | REVIEW AOC QUERIES AND ACTION | 12 ITEMS PER DAY | 30 SECS EACH | 12 | 0.5 | VA | E | 6.00 |

| DESCRIPTION | DATA/ ANALYSIS |
|---|---|
| #WORKING DAYS THIS MONTH | 21 |
| BASIC WORKING HOURS PER DAY (EXCL. LUNCH) | 8.00 |
| - 20mins MISC BREAKS PER PRODUCTION ASSOC | 0.33 |
| = AVAILABLE WORKING HRS PER PRODUCTION ASSOC | 7.67 |
| # FUNCTIONAL ASSOCIATES | 9.00 |
| % OF TIME IN PRODUCTION | 100% |
| # TEAM LEADS | 1.00 |
| % TIME IN PRODUCTION | 0% |
| BASIC TOTAL SUPPLY TIME (MINS PER DAY) | 4,140 |
| PAID OT (TOTAL DAYS VACATION IN LIEU OF PAY) | 0 |
| UNPAID OT (TOTAL HOURS THIS MONTH) | 0 |
| PAID OT (TOTAL DAYS VACATION IN LIEU OF PAY) | 0 |
| UNPAID OT (TOTAL HOURS THIS MONTH) | 0 |
| # OF VACATION DAYS THIS MONTH | 13 |
| # OF SICKNESS DAYS THIS MONTH | 13 |
| # OF VACATION DAYS THIS MONTH | 0 |
| # OF SICKNESS DAYS THIS MONTH | 0 |
| SUPPLY ADJUSTMENT (MINS PER DAY) | -570 |
| NET TOTAL SUPPLY TIME (MINS PER DAY) | 3,570 |
| OVERTIME CONTRIBUTION TO SUPPLY | 0.00% |
| FAT DEMAND TIME (MINS PER DAY) | 4,208 |
| NET CAPACITY BY TEAM | 118% |

FIG. 4

ADJUSTED NIEBA-BOM FOR THE PERIOD $172,016 DEMAND MINS: 79,442 COST PER MINUTE $2.17

2008 PHONE BILL (MARCH-MAY 08)

| CODE | EXECUTION DESCRIPTION | VOLUME | DEMAND TIME (mins) | UNIT PROCESS TIME (mins) | UNIT PROCESS COST ($) | TECH UNIT COST ($) | BOM UNIT COST ($) | TOTAL UNIT COST ($) | PRODUCT COST ($) | TOTALS |
|---|---|---|---|---|---|---|---|---|---|---|
| A | PAYMENTS | | | | | | | | | |
| A01 | HIGH VALUE PAYMENTS MANUAL | 402 | — | — | $ — | $ 0.20 | $ 0.66 | $ 0.86 | $ 344 | |
| A02A | HIGH VALUE PAYMENTS STP | 50,075 | — | — | $ — | $ 0.20 | $ 0.65 | $ 0.85 | $ 42,538 | |
| A02B | HIGH VALUE PAYMENTS REPAIR | 3,204 | — | — | $ — | $ 0.20 | $ 0.66 | $ 0.86 | $ 2,743 | |
| A03 | HIGH VALUE RECEIPTS | 18,043 | — | — | $ — | $ 0.10 | $ 0.23 | $ 0.33 | $ 5,991 | |
| A04 | LOW VALUE PAYMENTS ACH MANUAL | 89 | — | — | $ — | $ 0.08 | $ 0.07 | $ 0.15 | $ 13 | |
| A05A | LOW VALUE ACH PAYMENTS STP | 12,076 | 2,979 | 0.02 | $ 0.05 | $ 0.08 | $ 0.07 | $ 0.19 | $ 25,402 | |
| A05B | LOW VALUE ACH PAYMENTS REPAIR | 975 | 22 | 0.02 | $ 0.05 | $ 0.08 | $ 0.07 | $ 0.19 | $ 187 | |
| A06 | LOW VALUE ACH RECEIPTS | 59,879 | 335 | 0.01 | $ 0.01 | $ 0.05 | $ 0.07 | $ 0.13 | $ 7,855 | |
| A07 | LOW VALUE DIRECT DEBITS INCLEARING | 3,294 | 993 | 0.30 | $ 0.65 | $ 0.03 | $ 0.07 | $ 0.74 | $ 2,451 | |
| A08 | LOW VALUE DIRECT DEBITS OUTCLEARING | 61,665 | 1,055 | 0.02 | $ 0.04 | $ 0.03 | $ 0.07 | $ 0.13 | $ 8,044 | |
| A09 | CHEQUES/DRAFTS DEPOSITS | 976 | 4,967 | 5.09 | $ 11.02 | $ 1.10 | $ 0.07 | $ 12.19 | $ 11,893.50 | |
| A10 | CHEQUES/DRAFTS DEBITS | 3,573 | 12,622 | 3.53 | $ 7.65 | $ 0.25 | $ 0.07 | $ 7.96 | $ 28,458.15 | |
| | PAYMENTS TOTAL | 334,251 | 22,973 | | | | | | TOTAL | $135,921 |
| C | SERVICES | | | | | | | | | |
| C01 | NEW ACCOUNTS | | 1,344 | | | | | | $ 2,910 | |
| C02 | ACCOUNT CLOSINGS | | 875 | | | | | | $ 1,895 | |
| C03 | ACCOUNT CHANGES | | 420 | | | | | | $ 909 | |
| C04 | ITS ENQUIRIES | | 810 | | | | | | $ 1,754 | |
| C04A | PAYMENT ENQUIRIES | | 5,242 | | | | | | $ 11,351 | |
| C05 | CHEQUE STOP REQUESTS | | 669 | | | | | | $ 1,449 | |
| C06 | CHEQUE BOOK REQUESTS | | 80 | | | | | | $ 173 | |
| | SERVICES TOTAL | | 9,440 | | | | | | TOTAL | $20,440 |
| | | | | | | | | TOTAL EXECUTION COSTS | | $156,361 | 61% |

*FIG. 6A*

| CODE | MAINTENANCE DESCRIPTION | DEMAND TIME (mins) | COMMENTS | PROJECTED COST ($) | TOTALS | |
|---|---|---|---|---|---|---|
| D | ADMINISTRATION | | | | | |
| D01 | AUDITS | 1,740 | | $ 3,768 | | |
| D03 | AUDIT LETTERS | 300 | | $ 650 | | |
| D04 | COURT ORDER HANDLING | – | | $ – | | |
| D05 | DORMANCY | – | | $ – | | |
| D06 | ARCHIVING | 6,845 | | $ 14,821 | | |
| D07 | GENERAL ADMIN & MAINTENANCE | 8,958 | | $ 19,397 | | |
| D08 | EXPENSES & FIXED ASSETS CONTROL | 840 | | $ 1,819 | | |
| D09 | COMPLIANCE & OFAC | 4,229 | | $ 9,157 | | |
| D10 | GTS BUDGET FORECAST | 300 | | $ 650 | | |
| D11 | RECEPTION + MAIL | 2,100 | | $ 4,547 | | |
| D14 | SCM | 2,100 | | $ 4,547 | | |
| D17 | IT SUPPORT | 60 | | $ 130 | | |
| D20 | QUALITY REPORTING | 600 | | $ 1,299 | | |
| D22 | PDP's | 600 | | $ 1,299 | | |
| D23 | SCHEDULING TRAINING | – | | $ – | | |
| D24 | CROSS TRAINING | 240 | | $ 520 | | |
| | ADMINISTRATION TOTAL | 28,912 | | TOTAL | $62,603 | |
| E | CUSTOMER LEVEL MAINTENANCE | | | | | |
| E01 | CLIENT MANDATE & SIGNATURE MAINTENANCE | 1,780 | | $ 3,854.26 | | |
| E03 | CREDIT SUPPORT/ULO | 9,837 | | $ 21,300.23 | | |
| E06 | SCANNING & FAXING RE PAYMENTS | 1,260 | | $ 2,728.30 | | |
| | CUSTOMER LEVEL TOTAL | 12,877 | | TOTAL | $27,883 | |
| F | PRODUCT LEVEL MAINTENANCE | | | | | |
| F02 | ACCOUNTING CONTROLS | 2,728 | | $ 5,908 | | |
| F03 | ONGOING PROJECTS | 2,592 | | $ 5,613 | | |
| | PRODUCT LEVEL TOTAL | 5,320 | | TOTAL | $11,520 | |
| | | | | TOTAL MAINTENANCE COSTS | $102,006 | 39% |
| | | | | TOTAL PROJECTED COSTS FOR THE PERIOD: | $258,367 | 100% |

| ASSESSMENT | | | | | COMMENTS | | COST ANALYSIS (UNIT COST PER PHONE-BILL) | |
|---|---|---|---|---|---|---|---|---|
| PEOPLE | PROCESS | SYSTEMS | COMPLIANCE | EXTERNAL EVENTS | MITIGATION PLANS | TREND | PERIOD: MARCH THROUGH MAY 2008 | |
| 1 | 2 | 3 | | 4 | 1. SHORT TERM CAPACITY ISSUES BEING DRIVEN BY LONG TERM SICK & A DISMISSAL 2. FX LOSS HAS LEAD US TO QUESTION EFFECTIVENESS OF E2E PROCESS. 3. INCREASED NUMBER OF SEVERITY 1&2 ISSUES WITH CLIENT IMPACT HAVE RESULTED IN A PERIOD OF HEIGHTENED SENSITIVITY 3. BUSINESS CONTINGENCY PLANNING CONTINUES TO BE A STRONG FOCUS (e.g. BROMLEY / BACS TIME CRITICAL BEP TESTING). | ▶ | SCOPE BROMLEY, IRELAND, HYDERABAD, NETWORK EXPANSION + EURO BRANCHES PAYMENTS COVERAGE: BROMLEY COST CENTERS: 045, 408, 126 (LLOUDLIEW AND AAC), IRELAND OPERATIONS AND PAYMENTS COMPONENTS OF EURO-BRANCHES AMSTERDAM, ANTWERP, ATHENS, FRANKFURT, MADRID, MILAN, PARIS | |
| 1 | | | 2 | 3 | 1. 2 NEW CLERICAL ASSOCIATES CURRENTLY IN TRAINING 2a. NON COMPLIANT WITH EU REG 2560/2001 WHICH REQUIRES IBAN TO BE QUOTED ON CLIENT STATEMENT. 2b. NOT FULLY COMPLIANT WITH SWIFT 2007 REQUIREMENTS FOR BY ORDER INFORMATION OR EU PLAYER REQUIREMENT FOR 4 FIELDS OF BY ORDER INFORMATION DUE TO OUR MESSAGE TYPE MT100 NO LONGER BEING SUPPORTED. FUNDING APPROVED TO FIX IN 2008. 3. SLOVAKIA CONVERT TO EURO JAN09 | ▲▼ | ACTUAL COST FOR THE PERIOD PENDING CLARIFICATION ON BELOW THE LINE COSTS OPERATING RATIO (VOLUME DRIVEN COSTS) 45.7% | |
| 1 | | | | | 1. SHORT TERM CAPACITY ISSUES BEING DRIVEN BY MAIN VACATION PERIOD | ▶ | COST PER UNIT MODEL | |

| PRODUCT | TOTAL | % |
|---|---|---|
| HV MANUALS | $370,976 | 2% |
| HV STP | $1,688,262 | 8.3% |
| HV REPAIR | $304,760 | 1.5% |
| HV RECEIPTS | $730,340 | 3.6% |
| LV ACH MANUAL | $77,682 | 0.4% |
| LV ACH STP | $1,372,660 | 6.8% |
| LV ACH REPAIR | $76,226 | 0.4% |
| LV ACH RECEIPTS | $597,075 | 3.0% |

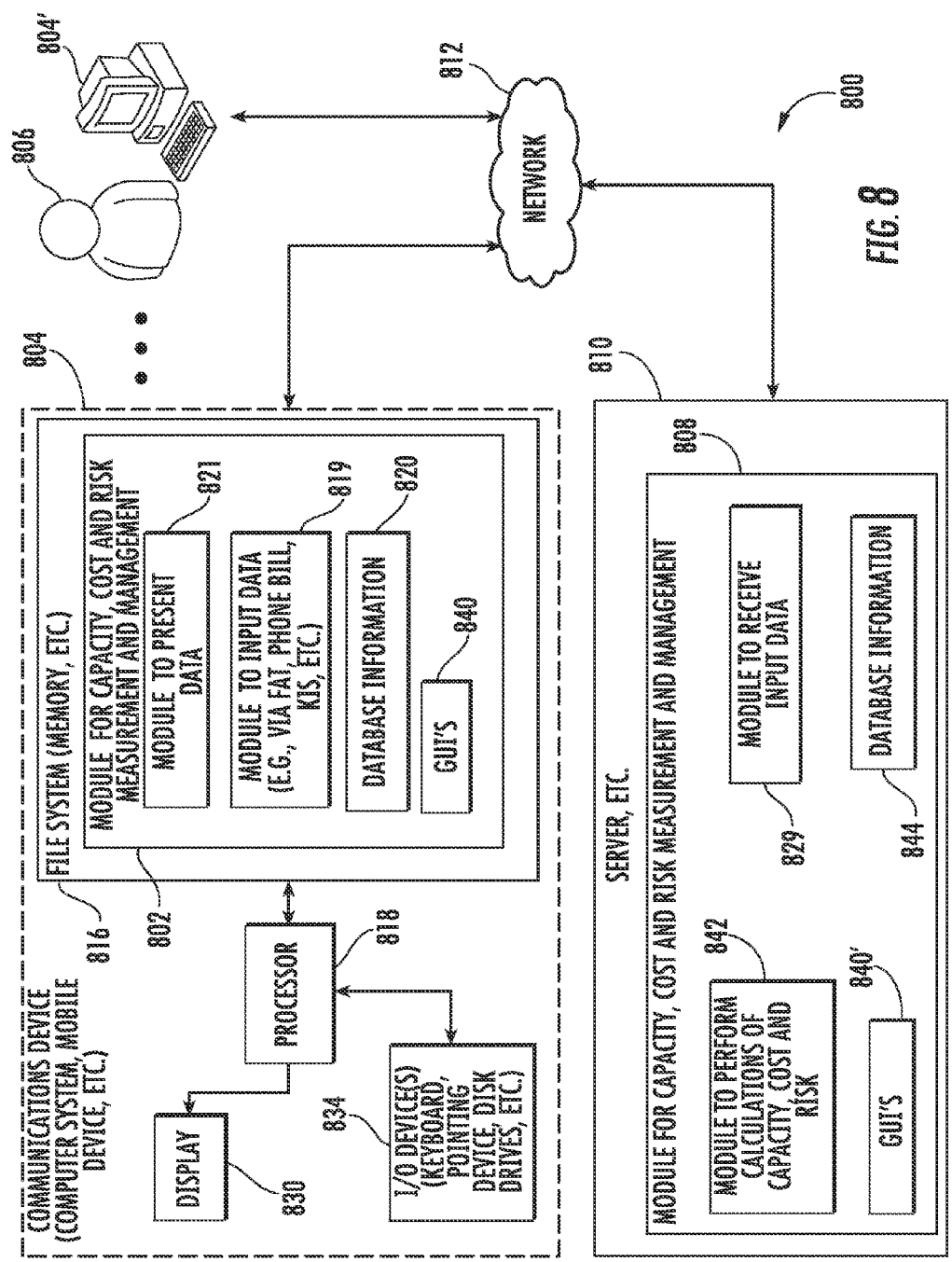

METHOD AND SYSTEM FOR CREATING DATA FOR BUSINESS RIGOR MEASUREMENT AND MANAGEMENT OF CAPACITY, COST AND RISK

BACKGROUND

Currently, banks have various departments and divisions, such as financing, client services, etc. In these departments/divisions, banks have employees to perform various tasks to sell products, including goods and/or services. The products are operated at a cost and on a volume-driven or non-volume-driven basis. However, currently there is no assimilation or aggregation of data or metrics to measure and manage the associated capacity, costs and risks across the business. Accordingly, there is a need for methods and systems to measure and appropriately manage these metrics as well as implement a workflow cycle to assure sustainability of these methods and systems.

SUMMARY

In accordance with an aspect of the present invention, a method for managing business rigor for a financial institution includes receiving business rigor data based on activities to implement a plurality of core products. A performance table, unit cost report, and summary report are created based on the business rigor data. The performance table may include data based on an analysis of the business rigor data; the unit cost report may include a cost report based on the performance table data; and the summary report may include a report based on the unit cost report. The summary report is then presented to a user. The user may use the report to implement improvement procedures for the core products.

In accordance with another aspect of the present invention, a method for managing business rigor includes identifying a plurality of core products and receiving via a computer system business rigor data based on activities to implement the plurality of core products. The computer system updates a performance table, a unit cost report, and/or a summary report based on the business rigor data. The unit cost report and/or the summary report is then presented to a user.

In accordance with yet another aspect of the present invention, a computer program product for a managing business rigor includes a computer-readable medium having a computer program residing thereon. The computer program includes instructions for receiving business rigor data based on activities to implement a plurality of core products. The computer program also includes instructions for updating at least one of a performance table, a unit cost report, and a summary report based on the business rigor data. The computer program further includes instructions for presenting at least one of the unit cost report and the summary report to a user.

In accordance with still yet another aspect of the present invention, an apparatus for managing business rigor includes a processor and a module operable on the processor. The module is configured to receive business rigor data based on activities to implement a plurality of core products and update a performance table, unit cost report, and/or summary report based on the business rigor data. The module may be further configured to present the unit cost report and/or the summary report to a user.

Other aspects and features of the present invention, as defined by the claims, will become apparent to those skilled in the art upon review of the following non-limited detailed description of the invention in conjunction with the accompanying figures.

BRIEF DESCRIPTION OF THE DRAWINGS

FIG. 3 is an example of a Function, Activity and Time ("FAT") table in accordance with an embodiment of the present invention.

FIG. 4 is an example of a supply table of the FAT table in accordance with an embodiment of the present invention.

FIGS. 6A and 6B (collectively FIG. 6) is an example a Phone Bill in accordance with an embodiment of the present invention.

FIGS. 7a and 7b (collectively FIG. 7) is an example of a key indicator scorecard (KIS) in accordance with an embodiment of the present invention.

FIG. 8 is a block schematic diagram of an example of a system for managing business rigor in accordance with an embodiment of the present invention.

DETAILED DESCRIPTION

Figure 1:
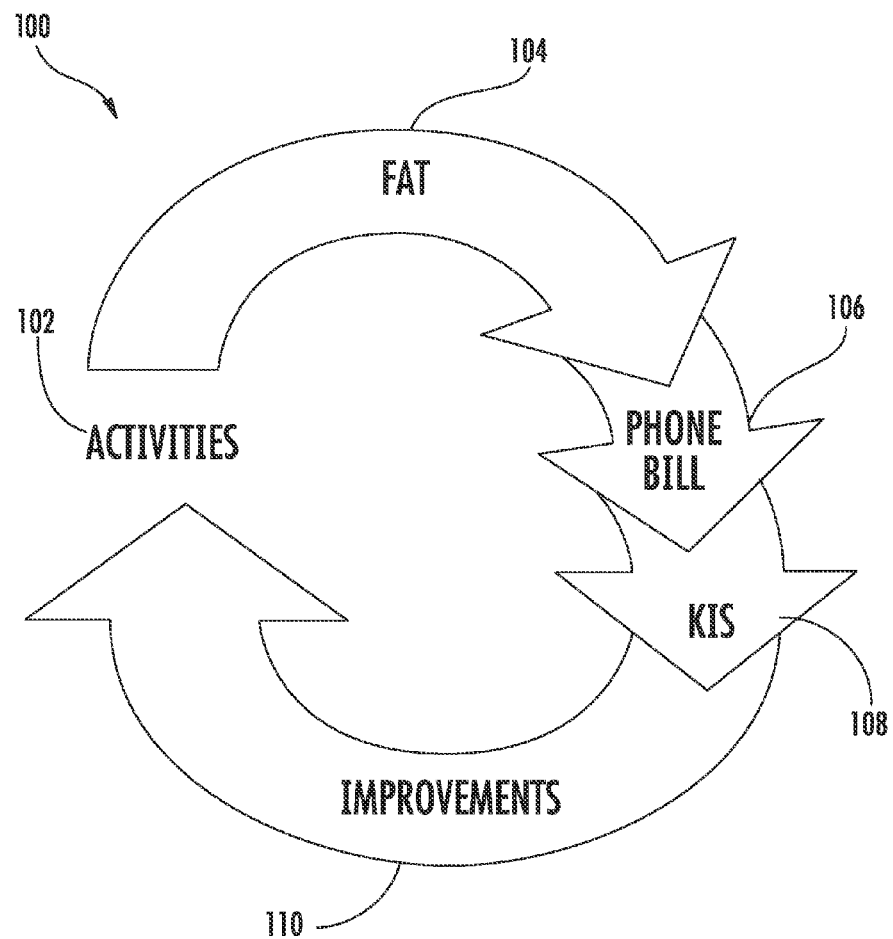
FIG. 1 is a flow chart of an exemplary process for managing business rigor in accordance with an embodiment of the present invention.

Embodiments of the present invention are described below with reference to flowchart illustrations and/or block diagrams of methods and apparatuses (systems, computer program products, devices, etc.). It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create a mechanism for implementing the functions/acts specified in the flowchart and/or block diagram block or blocks.

These computer program instructions may also be stored or embodied in a computer-readable medium to form a computer program product that can direct a computer or other programmable data processing apparatus to function in a particular manner, such that the instructions stored in the computer readable memory produce an article of manufacture including instructions which implement the function/act specified in the flowchart and/or block diagram block(s).

Any combination of one or more computer-readable media/medium may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any medium that can contain, or store a program for use by or in connection with an instruction execution system, apparatus, or device.

A computer-readable signal medium may include a propagated data signal with computer program instructions embodied therein, for example, in base band or as part of a carrier wave. Such a propagated signal may take any of a variety of forms, including, but not limited to, electromagnetic, optical, or any suitable combination thereof. A computer-readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc.

The computer program instructions may also be loaded onto a computer or other programmable data processing apparatus to cause a series of operation area steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Embodiments of the present invention may take the form of an entirely hardware embodiment, an entirely software embodiment (including firmware, resident software, microcode, etc.) or an embodiment combining software and hardware aspects that may all generally be referred to herein as a "module," "apparatus," or "system."

It should be understood that terms like "bank," "financial institution," and just "institution" are used herein in their broadest sense. Institutions, organizations, or even individuals, that process loans are widely varied in their organization and structure. Terms like "bank" and "financial institution" are intended to encompass all such possibilities, including but not limited to, finance companies, stock brokerages, credit unions, mortgage companies, insurance companies, companies other than financial companies/banks, etc. Additionally, disclosed embodiments may suggest or illustrate the use of agencies or contractors external to the financial institution to perform some of the calculations and data repository services. These illustrations are examples only, and an institution or business can implement the entire invention on its own computer system(s) or even a single work station if appropriate databases are present and can be accessed.

Embodiments of the present invention relate to systems and methods for managing business rigor 100 in a company, such as a financial institution. In one embodiment, business rigor relates to the resources employed in a financial institution, such as costs, employee capacity and utilization, unit volumes, value of products, capability, etc. Such business rigor can be built, measured, and managed for continuous improvement by using the methodology described herein for capacity, unit cost, and risk measurement and management. As such, business rigor is an operational part of the business being operated on a cost effective basis. The below-described systems and methods detail measurement and management of such business rigor by using various tools, including a performance template (or a Function, Activity, and Time ("FAT") template), a unit cost report ("Phone Bill"), and a summary report (or a Key Indicator Scorecard ("KIS")).

FIG. 1 is a flow chart of an example for managing business rigor 100 in accordance with an embodiment of the present invention. The flow chart illustrates a process for managing business rigor 100 in a company, such as a financial institution. As illustrated, daily activities or tasks 102 are performed by various representatives of the financial institution. Data related to these activities is captured and recorded along with the associated transaction volumes in the FAT table 104. The FAT table 104 is discussed in more depth below with regards to the discussion of FIGS. 3-4. After the FAT table 104 is established, the data in the FAT table 104 is used to develop a reporting of unit costs ("Phone Bill") 106. Additionally, the data from the FAT 104 and the Phone Bill 106 are employed to create the KIS 108, for current processes and risks. The data in the FAT table 104, Phone Bill 106, and KIS 108 are reviewed by associates, managers and key process owners to identify process improvement opportunities 110 such as cost cutting measures and other opportunities.

The flow chart 102 of FIG. 1 further illustrates a continuous improvement feedback loop 110 such that the above processes continually improve the end-to-end workflow and management of resources of the financial institution. This continuous loop facilitates ongoing improvement of the processes, work, and customer servicing for various departments/divisions within the financial institution, such as sales, products, risks, finance, client service, technology, and supply chain. This is due to the integration of the business management across the various departments/divisions of the company, instead of only a single department/division. Each of the FAT table 104, Phone Bill 106 and KIS 108 are described in more depth with regard to FIGS. 3-8.

Figure 2:
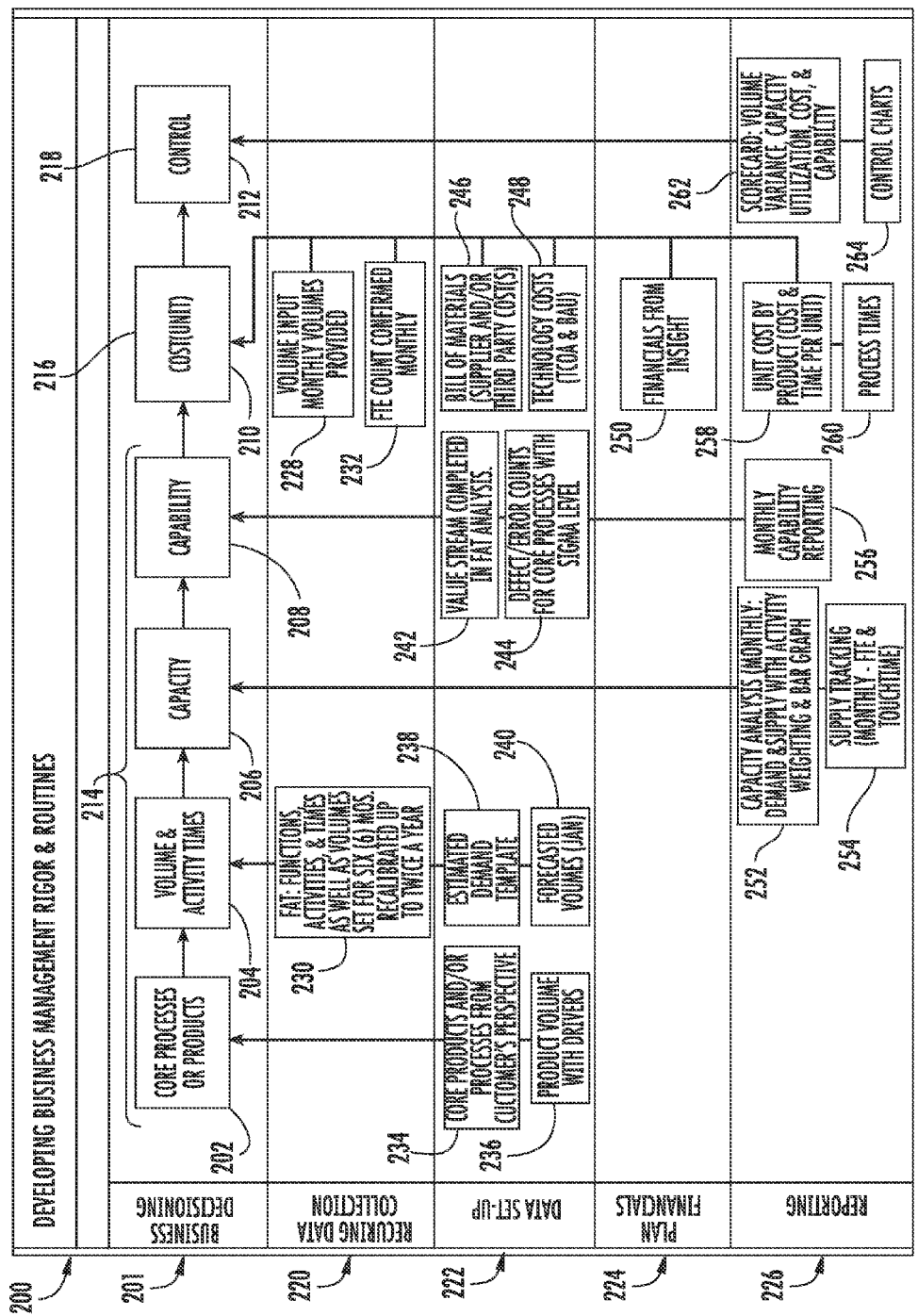
FIG. 2 is a flow chart of an exemplary process for developing business management rigor and routines in accordance with an embodiment of the present invention.

FIG. 2 is a flow chart 200 of an example for developing business management rigor and routines in accordance with an embodiment of the present invention. As illustrated, various business decisioning 201 refers to a category of processes where the business may make decisions instrumental to improving business rigor. The processes in the business decisioning 201 category of FIG. 2 include "Core Products" 202, "Volume and Activity Times" 204, "Capacity" 206, "Capability" 208, "Unit Costs" 210, and "Control" 212. The "Core Products" 202, "Volume and Activity Times" 204, "Capacity" 206, "Capability" 208" are associated with the FAT table 214; the "Unit Cost" process 210 relates to the Phone Bill 216; and the "Control Process" 212 relates to the KIS 218. Each of these processes is described later with respect to the discussion of the FAT, Phone Bill and KIS, respectively.

Other than the business decisioning 201 category of the flow chart 200 of FIG. 2, other processes in FIG. 2 are categorized as recurring data collection 220, data set-up 222, planning financials 224, and reporting 226. The recurring data collection 220 process relates to collecting data about the business, such as volume data 228, FAT data 230, full-time employee (FTE) information 232 and other data recurring periodically which may be collected.

The data-set up category 222 in FIG. 2 relates to data which may be inputted to set up data collection and inputs required to make business decisioning, such as inputting core products and/or processes 234, product volume with drivers 236, estimated employee demand template 238, forecasted volumes 240, value stream analysis 242, defect/error counts for core products 244, bill of materials (BOM) costs 246, technology costs 248, and other information which may be inputted or set-up.

The planning financials category 224 of FIG. 2 may relate to any information related to planning out projected, estimated and/or current financial information of the business. For example, financial information 250 may be inputted which may include current financial numbers of each core product/process to be input into the Phone Bill.

The reporting category 226 of FIG. 2 may relate to any information about the business that may be presented, such as capacity analysis 252, employee supply tracking 254, periodic capability reporting 256, unit cost by product/process 258, processing times 260, KIS scorecard 262, control charts 264, and other reports and presentation data.

FIG. 3 is an example a FAT table 300 in accordance with an embodiment of the present invention. Generally, the FAT table 300 is a document owned by the financial institution that provides various information. For example, the FAT table 300 provides a complete view of all functions performed by the financial institution or to a portion of the business. The functions in the FAT table 300 are broken down at the team level and additionally records individual activities performed within each function. Activity volumes and timings for all the activities performed as also documented in the FAT table 300. This provides the amount of employee resource time required to support the business ("demand time"). The FAT table 300 may also provide employee resource details including full-time employee (FTE) volumes and attendance details ("supply time"). The FAT table 300 further provides an overall view of capacity based on the above-mentioned demand and supply time data. This capacity figure then becomes a key metric in assessing the ability to support the business. The FAT table 300 also provides value streams for all activities performed. Value streams indicate what value level is assigned to each activity, such as "value-added" for high value activities, "non-value added" for activities that have low value (or no value) to the business, etc. This enables management to differentiate between activities characterized as "value-added" (VA) and "non-value added" (NVA) activities. Analysis of the NVA steps may provide process improvement opportunities or productivity benefits. The FAT table 300 also provides for a summary view of capacity details and key metrics to be included in period-ending management reporting. This summary becomes the input for the KIS document. Details of the KIS are discussed later with regard to FIG. 7. The FAT table 300 further allows for a way of linking each business function to one or more of the business' core products, services or administration and maintenance functions. This enables the financial institution to calculate the associated aspects of the unit costs. Details of the Phone Bill are discussed later with respect to FIG. 6.

As previously mentioned, an exemplary FAT table 300 is illustrated in FIG. 3. The core products of the business are listed in the FAT table 300 and have various data associated with each product/process, including process flow, volumes, activity times and value streams. For example, the columns of FIG. 3 include data for "Functions," "Activities," "Volumes of Transaction Per Activity," "Daily Minutes Per Activity," "Daily Volume," "Daily Time Per Volume," "Value Stream," "Activity Type," and "Minutes Per Day Summary." The "Functions" column lists all the functions performed by a specific team as part of the team's working days, months and/or year. The "Activities" column on the FAT table 300 lists all the activities at a reasonably high level that are involved in each of the functions. The "Volumes of Transaction Per Activity" column and "Daily Minutes Per Activity" column detail activity volumes per period (e.g., daily, weekly, monthly, etc.) and item times or total times that each activity takes (e.g., seconds, minutes, hours, etc.), respectively. The volume data may come from numerous existing reports or may be captured manually. The time data may come from time and motion studies; however, the time data may be approximated figures based on subject matter experts estimations. For the "Daily Volume" column and "Time Per Item/Min" column, the data from the "Transaction Volumes Per Activity" and "Daily Time Per Activity" columns are converted into equivalent daily volumes and item times. The "Value Added Determination" column identifies if the activities are value added (VA), non-value added (NVA), business value added (BVA) or risk value added (RVA). Reviewing NVA activities may provide process improvement opportunities. The "Activity Type" column advises whether the associated function is related to "Execution," "Maintenance," or "Growth" processes to determine if the process relates to execution of the process/product, maintenance of the business or process/product, or growth of the business, respectively. The "Minutes Per Day Summary" column is a multiple product of the "Daily Volume" column and the "Time Per Item/Min." column. This indicates the daily resource demand minutes for each function.

In the FAT table 300, variable process volumes, timings, FTE levels and attendance details are updated by the business during a period (e.g., the current month) related to a previous period (e.g., the previous month). New functions and timings are added to the FAT table 300 and redundant functions are deleted. All changes to the FAT table 300 are verified for accuracy. Once the FAT table 300 has been verified and ensured total demand time matches the sum of the individual teams, then the final capacity data can be determined.

The FAT table 300 may also include a supply table 400. FIG. 4 is an example of a supply table 400 of the FAT table 300 in accordance with an embodiment of the present invention. The supply table 400 indicates team data relating to the team that performs the functions in the FAT table 300. As illustrated, the supply sheet 400 determines the "Net Total Supply Time" or the total amount of available work time. This may be accomplished using the following inputs illustrated in the supply sheet 400: "Number of Working Days," "Number of Functional Associates," "Number of Team Leads," Percent Time in Production," and data relating to overtime, vacation and sick leave. After determining the total supply time and a FAT demand time (discussed below), the "Net Capacity by Team" is determined by dividing the FAT demand time by the total supply time (demand/supply).

Thus, the FAT table 300 provides the demand minutes per unit of core product/process, calculated by cross referencing the activities of a plurality of employees across a plurality of different teams in the financial institution. Combining this with the break down of maintenance minutes by category allows for a determination of the unit cost in the Phone Bill. Additionally, by calculating demand and supply minutes across the plurality of teams, the employee workload capacity and capability of each team is determined. This provides management with accurate data that can be used to make decisions for a plurality of processes and not just a single focused process. This also enables studies to be carried out around employee resources in line with future business growth.

After determining the FAT table 300 along with the supply sheet 400, the Phone Bill may be developed. As previously discussed, the Phone Bill may be a complete view of all costs incurred to run the financial institution. The Phone Bill includes detailed information on the costs incurred by core products based on the resources utilized for fulfillment thereof. The Phone Bill provides an understanding of the cost drivers in terms of being either volume or non volume driven and also describes the types of costs as determined by activity-based costs of maintenance, execution or growth processes. The Phone Bill allows the financial institution to apply volume forecasts to the products that are volume driven (i.e., fulfilling products) vs. non-volume driven (administration, maintenance) and thus, allow the financial institution to obtain a better understanding of specific cost changes due to market changes in volume, process improvements, technology upgrades, etc. This will enable the financial institution to forecast and budget more accurately. The Phone Bill also provides information to consider when pricing the products and a probable market advantage in knowing the costs involved when tendering for new business opportunity, as well as aiding understanding of profitability information by product. Employee capacity and other costs are also detailed in the Phone Bill to provide an overview of the complete business across multiple divisions of the company in terms of various costs of the company, including costs related to product execution, maintenance, and growth. An example of a Phone Bill is illustrated in FIG. 6 and discussed below. Various information from the FAT and other sources are imported into a system that generates the Phone Bill. A discussion of generating the Phone Bill is discussed below with regard to FIG. 5.

Figure 5:
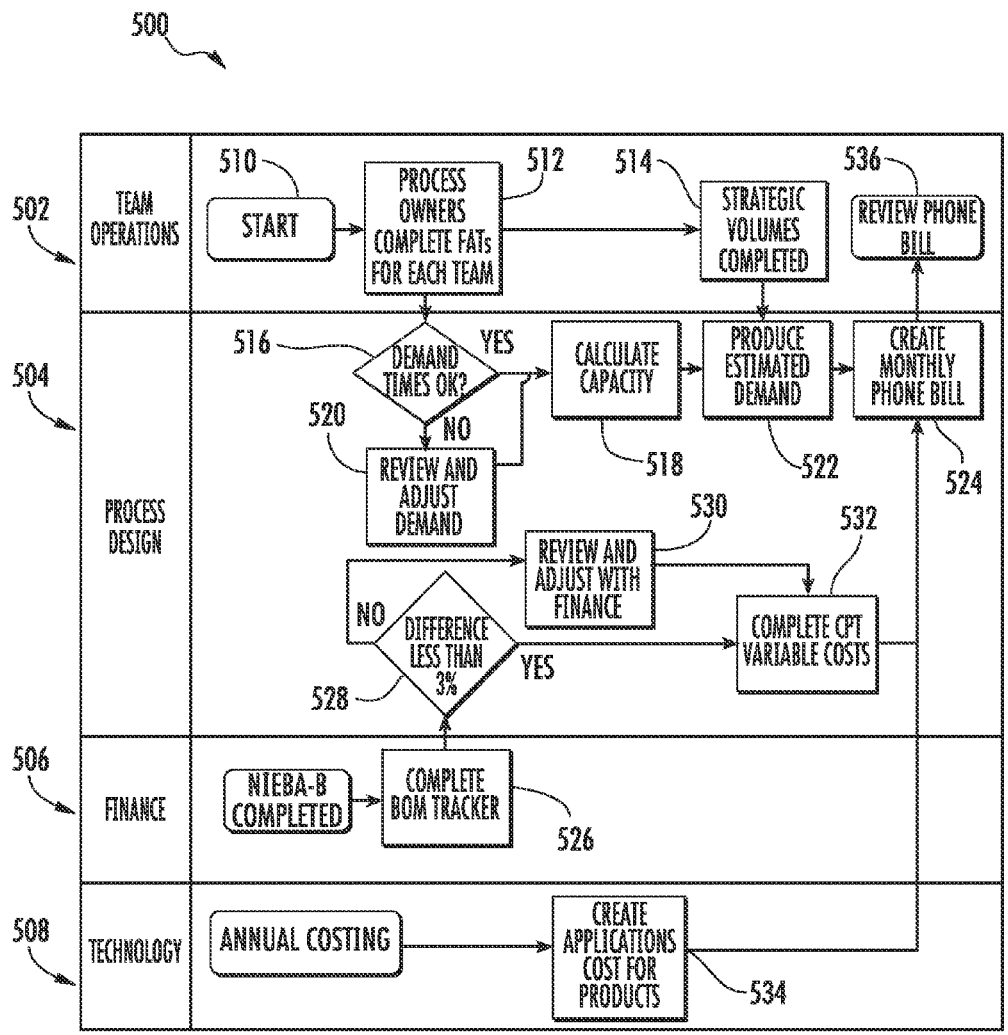
FIG. 5 is a flow chart of an exemplary process for generating a unit cost report ("Phone Bill") in accordance with an embodiment of the present invention.

FIG. 5 is a flow chart 500 of an example of generating a Phone Bill in accordance with an embodiment of the present invention. As illustrated, at least four entities may act to implement these tasks, such as team operations 502, process design 504, finance 506, and technology 508. In block 510, the process 500 begins and proceeds to block 512 where process owners complete a FAT table for each team. The FAT table was previously described above with regard to FIGS. 3-4. The output of block 512 is sent to block 514 and decision block 516. In decision block 516, a determination is made as to whether demand times in the FAT tables are acceptable. Such determination may be made based on criteria predefined by the financial institution. If the demand times in the FAT table are determined to be acceptable, the process 500 proceeds to block 518; otherwise, the process 500 continues to block 520.

In block 520, if the demand time is not acceptable, the demand time and variables related thereto are reviewed and adjusted by the financial institution. After adjustments, the process 500 proceeds to block 518. In block 518, the employee capacity is calculated, as was previously described with regard to FIGS. 3-4. In block 522, total estimated demand is produced by comparing the demand time with the employee capacity. This information provides the financial institution with data related to employee workloads, utilization, efficiency, etc. to determine if employee resources are being used efficiently and effectively. The total estimated demand is used to create the Phone Bill in block 524. As such, the total estimated demand can be reviewed in the Phone Bill at block 536.

In block 526, a representative enters the vendor costs, also known as Bill of Material (BOM) costs, into a BOM Tracker spreadsheet for the month they are received. The BOM tracker spreadsheet is used to populate the Cost Per Unit (CPT) Variable worksheet for those costs that are volume driven and aligns them to the strategic volume for calculating Vendor Cost Per Unit (CPT). The Vendor Cost Per Unit is calculated using excel formulas to apply the cost to the volume. This may be accomplished by a Process Design employee.

In block 528, one or more Process Design employees check the BOM figures against the budgeted financial figures to ensure there are no discrepancies above 3%. If there are discrepancies above 3%, the process 500 continues to block 530 where the Process Design employee investigates with the vendor or invoice as to why the charges are different. The unit cost will be adjusted once the difference is understood and agreed to be an appropriate change.

In block 532, the cost per transaction (CPT) costs are then calculated and then are used in creating the monthly Phone Bill in block 524. Such information may then be viewed in the Phone Bill at block 536.

In block 534, the Technology group will annually provide the Process Design team with system technology-related costs (i.e., variable and fixed costs) and the costs tied back to the products the Technology group supports.

With the above-described information, the Process Design team creates the Phone Bill which summarizes all costs by collating all of such information (block 524). This is accomplished by each business region to compile the Phone Bill spanning multiple business groups. The operations team then reviews the Phone Bill in block 536. An exemplary Phone Bill is described below.

FIG. 6 is an example a Phone Bill in accordance with an embodiment of the present invention. As illustrated, the Phone Bill has two sections, an Execution section and a Maintenance section. The Execution section of the Phone Bill relates to costs associated with execution of one or more processes, such as performing transactions for a product. The Maintenance section of the Phone Bill relates to costs associated with maintenance of products, such as employee training, administrative tasks, setting up products, audits, etc. It should be understood that other sections may also be included in the Phone Bill, such as a Growth section (not shown), which would relate to costs associated with growing the business by adding new products.

Referring first to the Execution section of the Phone Bill, listed are various core products involved in the internal functions and activities of the financial institution, such as "High Value Payments Manual," "Low Value ACH Receipts," etc. A volume and associated demand time is listed next to each process. It is noted that no demand figures are listed with some of the products. This is likely due to the process being automated such that no human demand time is required. Regardless, a unit process time, unit process cost, tech unit cost, and BOM unit cost associated with each process is also listed in the Phone Bill. The unit process time is calculated by dividing the demand time by the volume. The unit process cost is calculated by multiplying the unit process time a cost per minute which is inputted to the Phone Bill. The tech costs are costs associated with technology required to implement the process. The BOM costs are inputted vendor costs, as previously described. All of these costs are used in determining a total unit cost figure. The total unit cost figure is calculated by summing the unit process cost, the tech unit cost and the BOM unit cost. The process/product cost is then calculated by multiplying the total unit cost by the volume. This is the total cost associated with the listed process/product. After determining the costs for each core process/product, all of the process/product costs for the Execution section are summed and displayed as a total cost. As illustrated in FIG. 6, the Execution section is shown as separated into a "Payments" section and a "Services" section. This is only to separate the volume driven costs and the non-volume driven costs. The non-volume driven costs are determined by multiplying the demand time by the unit costs.

After determining the total costs for all products, both volume-driven and non-volume driven, for the Execution section, a total Execution cost is calculated. The Execution costs relate to costs associated with executing various products of the financial institutions.

In addition to the Execution costs, costs associated with the Maintenance section are determined using a similar process described above for the Execution costs. The maintenance costs relate to costs associated with maintaining products, such as audits, compliance activities, IT support, etc. After determining the total costs for all sections (e.g., Execution, Maintenance, etc.), a total projected cost for the period is obtained by summing the total costs of all sections. This information is associated across a plurality of business groups of the financial institution. In one embodiment, the Phone Bill includes costs spread across all business groups of the financial institution.

Figure 7A:
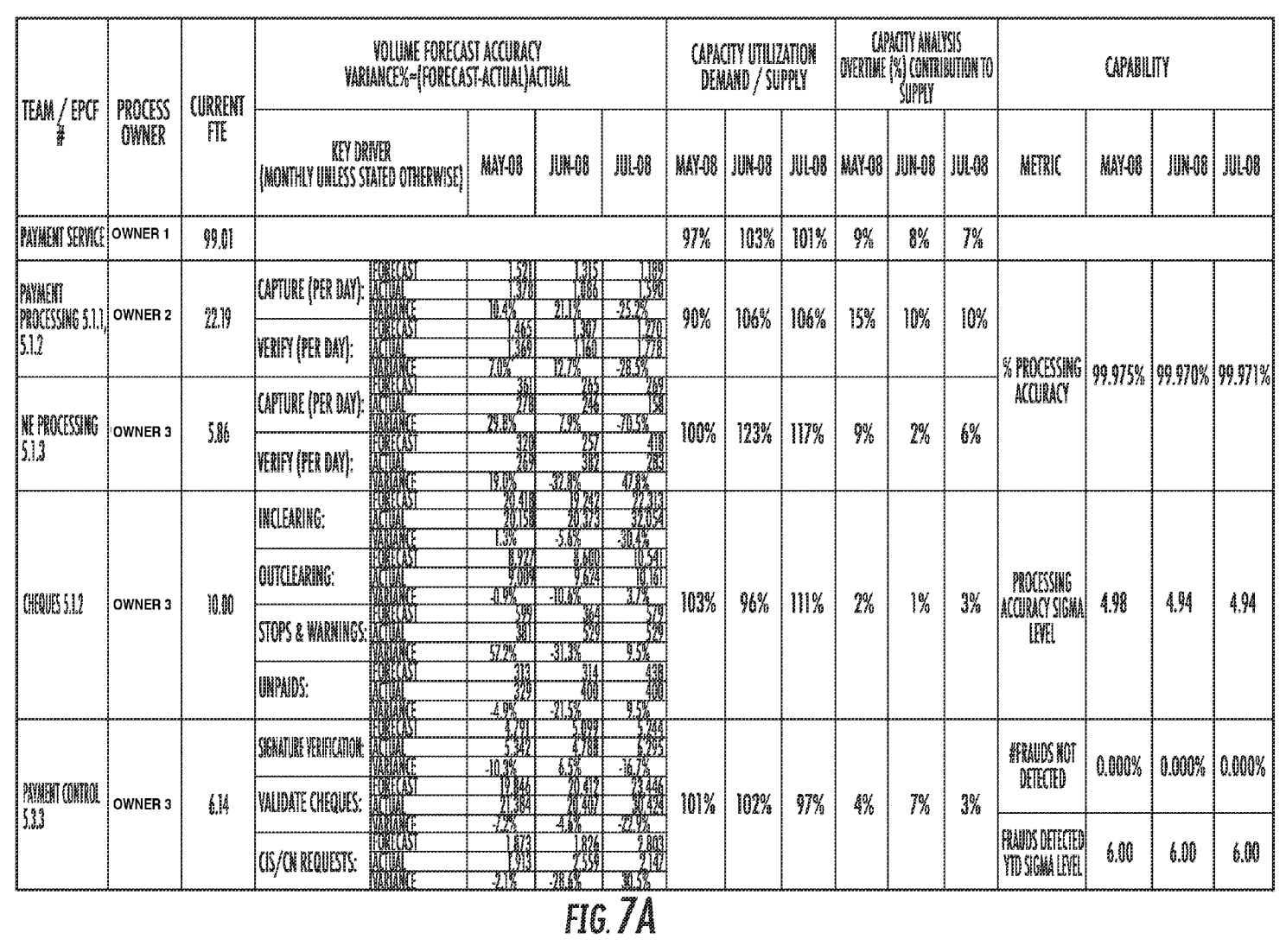

The information from the Phone Bill is imported into the KIS. FIGS. 7A and 7B (collectively FIG. 7) is an example of a key indicator scorecard (KIS) in accordance with an embodiment of the present invention. The KIS provides a "one-stop-shop" for all metrics data deemed as key in making business decisions. The data is collated showing a rolling view of team details, key volume trends (forecast vs. actual) across the different teams, team capacity figures, other capacity figures, risk figures and commentary and other information. The team details include process owners and full-time employee (FTE) levels. The team capacity figures identify the ability to handle current workloads as well as absorb additional work. Other capability figures identify how well the business is operating in relation to various goals and targets. Risk figures and commentary includes mitigation plans, action steps and trending information.

The KIS document enables the financial institution to view volume, capacity, capability and control data in one place. The KIS captures a rolling view over a specified period, such as over a three month period. The data allows management to assess current state, and allows for comments to be added around mitigation plans and action steps.

As illustrated in FIG. 7, the KIS illustrates various data associated with teams of the financial institution, where each team has a process owner. The first data presented is number of current full-time employees associated with each respective team.

The second set of data in FIG. 7 is the "Volume Forecast Accuracy" which is separated into data associated with a plurality of key drivers. With each key driver, forecasted data is compared with actual data and a variance thereof is presented for each period (e.g., month). The forecasted volume is based on a daily average volume from the previous period so that variation in the number of working days from one period to the next does not impact the outcome. The variance is calculated by dividing the difference between the forecasted data and the actual data by the actual data. As illustrated, the variance data may be placed in different categories, such as 0-10%, 10%-20%, and more than 20%. The volume forecast information illustrates a rolling three month snapshot.

The third set of data in FIG. 7 is under "Capacity Utilization," where for each period (e.g., month), a percentage of the demand over supply. This determines how much employee time is required over how much employee capacity is available. For example, a capacity utilization of 123% means that there is not enough employee utilization to achieve what needs to be done for execution, maintenance and growth of the core products and the financial institution. Conversely, a capacity utilization of 90% indicates that the employee time is higher than what is needed and thus can be adjusted to areas where employee resources are needed. Ideally, the scope of capacity utilization would be approximately 90% so that employees are able to absorb additional volume and deal with short term challenges, typically relating to external events or market conditions.

The fourth set of data in FIG. 7 is under "Capacity Analysis," indicating an overtime contribution percentage for each period. Such information provides data reflecting overtime worked by employees as a percentage of the employee supply time. This metric may provide overtime cost and employee morale information.

The fifth set of data in FIG. 7 is under "Capability," which provides various data of accuracy for each period. For example, accuracy data is provided for each capability metric, such as percent processing accuracy, processing accuracy sigma level, number of frauds detected, frauds detected year-to-date sigma level, etc. This provides information to determine how well each process/product is being executed.

In the sixth column in FIG. 7 under "Assessment" includes inputted thoughts based on what the data in the KIS means to a manager at the financial institution. Various categories may be included, such as people, process, systems, compliance, external events, etc. Thus, a manager can review the core products in terms of volumes, capacity, capability and capacity to input manually determined scores in each of the various categories. These scores relate to the comments in the KIS, discussed below.

In the "Comments" column of the KIS allows management to provide any comments based on the data in the KIS, such as actions, mitigation plans, etc. These comments may then be provided to team members and discussed to implement any possible mitigation plans or other actions.

The "Cost Analysis" column of the KIS relates to other generic metrics required on a periodic basis. This data originates from elsewhere but are captured as part of a summary of the KIS. In one embodiment, this data is automatically fed from the Phone Bill.

FIG. 8 is a block schematic diagram of an example of a system for managing business rigor in accordance with an embodiment of the present invention. The system 800 includes a module for business rigor management 802 operable on a computer system 804 or similar device of a user 806 or a client. In addition to the module for business rigor management 802 on the user's computer system 804 or client, the system 800 includes a module for business rigor management 808 operable on a server 810 and accessible by the user 806 or client 804 via a network 812. The methods 100, 200 and 500 are embodied or performed by the module for business rigor management 802 or the server module for business rigor management 808. For example, the methods 100, 200 and 500 may be performed by the module for business rigor management 802. In another embodiment of the invention, the methods 100, 200 and 500 are performed by the server module for business rigor management 808. In a further embodiment of the present invention, some of the features or functions of the methods 100, 200 and 500 are performed by the module for business rigor management 802 on the user's computer system 804 and other features or functions of the methods 100, 200 and 500 are performed on the server module for business rigor management 808.

The network 812 is the Internet, a private network or other network as previously mentioned. Each computer system 804' is similar to the exemplary computer system 804 and associated components as illustrated in FIG. 8.

The module for business rigor management 802 and/or 808 is a self contained system with imbedded logic, decision making, state based operations and other functions to measure and manage business rigor for capacity, cost and risk.

The module for business rigor management 802 is stored on a file system 816 or memory of a computer system 804. The module for business rigor management 802 may be accessed from the file system 816 and run on a processor 818 associated with the computer system 804.

The module for business rigor management 802 includes a module to input data 819. The module to input data 819 allows entry of various metrics information into the system 300, such as volume, capacity data, employee information, core products, cost information, target information, and any other desired information. The inputted information may be related to one or more or all business groups within a company or financial institution. In one embodiment, the inputted information may be sent for processing or direct automatically inputted into the FAT, Phone Bill or KIS. The module to input data 819 is accessed or activated whenever the user 806 desires to input information, including various metric information or other information, and calls other modules such as the graphical user interface 840, as described below. The input of business rigor information is received by the module to receive input data 829 on the server 810 via the network 812.

The server module for business rigor management 808 also includes database information 820. The database information 820 includes any stored information related to the metrics of the financial institution, such as core products volumes, cost information, employee volumes, capacity, capabilities, and any other information associated with business rigor. The database information 820 may serve as a location to store various information from period to period, such as on a monthly basis. The database information 820 may further store processed data for archiving and for future reference or access. The database information 820 may be stored in a database (not shown) resident on the server and/or locally on one or more computers.

The module for business rigor management 802 also includes a module to present data 821. The module to present data 821 presents the FAT, Phone Bill, KIS and/or other information to the user 306. In addition to presenting the FAT table, Phone Bill and KIS, the module to present data 821 may create reports, templates, and/or other data for use by the user 306, future processing, or for other purposes. The module to present data 821 works in concert with the graphical user interface 340 to present the information on an output device (discussed below), store data in the file system 316 or database information 320, and the like.

The user's computer system 804 includes a display 830. Any presentation data and/or any graphical user interfaces 840 associated with the module for business rigor management 808 may be presented on the display 830. The user's computer system 804 also includes one or more input devices, output devices or combination input and output devices, collectively I/O devices 834. The I/O devices 834 may include a keyboard, computer pointing device, touch screen, touch pad, or similar devices to control input of information as described herein. The I/O devices 834 also include disk drives or devices for reading computer media including computer readable or computer operable instructions.

The server module for business rigor management 808 includes a module to receive input data 829. As previously discussed, the module to receive input data 829 receives inputted data from the module to input data 319 and/or database information 320, 344 from a database (not shown). After receiving any input data or database information, the module to receive input data 829 transmits the data to one or more modules on the server 310 or computer 304. The module to receive input data 829 may perform other operations such as communicating with other modules on the server 310 and transmitting any information received therefrom to one or more of the user's computers 304.

The server module for business rigor management 808 includes a module to perform calculations of capacity, cost, and risk 842. The module to perform calculations of capacity, cost, and risk 342 performs various functions, such as developing portions of the FAT, Phone Bill and KIS, and performing other processing and calculations of data in the system. The module to perform calculations of capacity, cost, and risk 342 receives predefined criteria to perform such data processing.

The server module for business rigor management 808 also includes database information 844. The database information 844 is similar to the database information 820 of the user's computer 304, previously discussed. For example, database information 844 includes any stored information related to the metrics of the financial institution, such as core products volumes, cost information, employee volumes, capacity, capabilities, and any other information associated with business rigor.

The module for business rigor management 802, 808 includes graphical user interfaces 840, 840', as previously mentioned. The module for business rigor management 802, 808 allows one or more predetermined graphical user interfaces 840 to be presented to the user 806 in order for the user 806 to input data or information into the system 800. The graphical user interfaces 840 are predetermined and/or presented in response to the user 806 indicating the user 806 would like to perform a task, such as requesting input information, requesting other information, inputting information, presenting information to the user 306 and financial institution, etc. The predetermined graphical user interfaces 840 are generated by the module for business rigor management 802, 808 and are presented on the display 830 at the computer system 804. Graphical user interfaces 840 also include graphical user interfaces that permit the user 806 to view the FAT, Phone Bill and KIS and query any of the databases and/or generate reports and/or standardize documents.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, functions repeated by the two blocks shown in succession may, in fact, be executed substantially concurrently, or the functions noted in the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention, unless the context clearly indicates otherwise. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for measuring and managing business rigor for a financial institution, comprising:
   identifying a plurality of core products of the financial institution;
   receiving business rigor data based on activities of a plurality of employees implementing the plurality of core products of the financial institution, wherein the received business rigor data comprises data for core products for at least two lines of business at the financial institution, and wherein the business rigor data further comprises at least volume data, efficiency data, business capacity data, and business capability data;
   creating, via a computer system, a performance table for the financial institution based at least in part on an analysis of the business rigor data, wherein the performance table for the financial institution comprises at least:
   a) a list view of a plurality of activities performed by a plurality of employees for implementing each of the plurality of core products,
   b) a list view of resource time associated with performing each of the plurality of activities by the plurality of employees required to support each of the plurality of core products,
   c) a link for each of the plurality of activities of the plurality of employees to one or more of the plurality of core products, and
   d) a value added determination for each of the plurality of activities of the plurality of employees;
   creating a unit cost report based at least in part on data in the performance table for the financial institution, wherein the unit cost report comprises at least a view of costs incurred in supporting each of the plurality of core products;
   creating a summary report, wherein the summary report is based at least in part on the unit cost report and includes capacity figures for the plurality of employees indicative of the ability to handle current workloads and take on additional work, and wherein the summary report comprises a multiple rolling view of at least one of:
   (1) volume trends across different teams in the financial institution, and
   (2) capability figures to identify how well the financial institution is operating in relation to goals and targets;
   presenting the unit cost report prior to presenting the summary report; and
   presenting the summary report, wherein at least one of:
   the performance table comprises a Function, Activity and Time (FAT) table,
   the unit cost report comprises a Phone Bill, and
   the summary report comprises a Key Indicator Scorecard (KIS).

2. The method of claim 1, further comprising modifying the activities to implement the plurality of core products in response to the summary report.

3. The method of claim 2, further comprising:
   receiving business rigor data based on the modified activities to implement the plurality of core products;
   updating the performance table, the unit cost report, and the summary report based on the business rigor data; and
   presenting the updated summary report.

4. The method of claim 2, wherein the modified activities are activities to support the plurality of core products.

5. The method of claim 1, further comprising categorizing the plurality of core products into one of execution, maintenance, and growth.

6. The method of claim 1, wherein the business rigor data comprises data regarding execution, maintenance and growth of the plurality of core products.

7. The method of claim 1, wherein the business rigor data is periodically received and the performance table, unit cost report, and summary report are periodically updated based on the business rigor data received for each period and the summary report is presented for each period.

8. The method of claim 1, wherein the received business data relates to business rigor data for the plurality of core products.

9. The method of claim 1, wherein the business rigor data comprises employee capacities and process or product volumes.

10. The method of claim 1, wherein the performance table comprises at least one of:
    a summary view of employee capacity details and key metrics.

11. The method of claim 1, wherein the unit cost report comprises at least one of:
    detailed information on costs incurred by the plurality core products; and
    a determination of whether the costs is an execution cost, maintenance cost or growth cost.

12. A method for managing business rigor, comprising:
    identifying a plurality of core products of a business entity;
    receiving via a computer system business rigor data based on activities to implement the plurality of core products, the business rigor data comprising employee capacity and costs associated with execution of the plurality of core products, wherein the received business rigor data comprises data for core products for at least two lines of business of the business entity, and wherein the business rigor data further comprises at least volume data, efficiency data, business capacity data, and business capability data;
    updating a performance table for the business entity based at least in part on an analysis of the business rigor data, wherein the performance table for the business entity comprises at least:
    a) a list view of a plurality of activities performed by a plurality of employees for implementing the plurality of core products;
    b) a list view of resource time associated with performing each of the plurality of activities by the plurality of employees required to support each of the plurality of core products, c) a link for each of the plurality of activities of the plurality of employees to one or more of the plurality of core products, and d) a value added determination for each of the plurality of activities of the plurality of employees;

updating via the computer system a unit cost report based at least in part on the updated performance table for the business entity, wherein the unit cost report comprises at least a list view of all costs incurred in supporting each of the plurality of core products;

updating a summary report, wherein the summary report is based at least in part on the updated unit cost report and includes capacity figures for the plurality of employees indicative of the ability to handle current workloads and take on additional work, and wherein the summary report comprises a multiple rolling view of at least one of:

(1) volume trends across different teams in the business entity, and (2) capability figures to identify how well the business entity is operating in relation to goals and targets;

presenting the unit cost report prior to presenting the summary report; and presenting at least one of the unit cost report and the summary report to a user, wherein at least one of:

the performance table comprises a Function, Activity and Time (FAT) table, the unit cost report comprises a Phone Bill, and the summary report comprises a Key Indicator Scorecard (KIS).

13. The method of claim 12, further comprising:

reviewing the summary report; and implementing improvement procedures in response to reviewing the summary report.

14. The method of claim 13, wherein the implementing improvement procedures comprise modifying the activities to implement the plurality of core products.

15. The method of claim 14, further comprising:

periodically receiving business rigor data based on the modified activities to implement the plurality of core products;

periodically updating the performance table, the unit cost report, and the summary report based on the business rigor data; and presenting the updated summary report.

16. The method of claim 12, wherein the performance table comprises data based on an analysis of the business rigor data, the unit cost report comprises a cost report based on data in the performance table data, and the summary report comprises a report based on the metrics and performance data in the unit cost report and the performance table.

17. The method of claim 12, wherein the business rigor data comprises data regarding execution, maintenance and growth of the core products.

18. The method of claim 12, wherein the business rigor data is periodically received and the performance table, unit cost report, and the summary report are periodically updated based on the business rigor data received for each period and the summary report is presented for each period.

19. An apparatus for managing business rigor, comprising:

a processor; and a module operable on the processor, wherein the module is configured to:

identify a plurality of core products of one business entity;

receive business rigor data based on activities to implement a plurality of core products, wherein the received business rigor data comprises data for core products for at least two lines of business of the one business entity, and wherein the business rigor data further comprises at least volume data, efficiency data, business capacity data, and business capability data;

update a performance table for the one business entity based at least in part on an analysis of the business rigor data, wherein the performance table for the one business entity comprises:

a) at least a list view of a plurality of activities performed by a plurality of employees for implementing the plurality of core products;

b) a list view of resource time associated with performing each of the plurality of activities by the plurality of employees required to support each of the plurality of core products, c) a link for each of the plurality of activities of the plurality of employees to one or more of the plurality of core products, and d) a value added determination for each of the plurality of activities of the plurality of employees;

update a unit cost report based at least in part on the updated performance table for the one business entity, wherein the unit cost report comprises at least a view of all costs incurred in supporting each of the plurality of core products;

update a summary report, wherein the summary report is based at least in part on the unit cost report and includes capacity figures for the plurality of employees indicative of the ability to handle current workloads and take on additional work, and wherein the summary report comprises a multiple rolling view of at least one of:

(1) volume trends across different teams in the one business entity, and (2) capability figures to identify how well the one business entity is operating in relation to goals and targets;

presenting the unit cost report prior to presenting the summary report; and present the summary report to a user, wherein at least one of:

the performance table comprises a Function, Activity and Time (FAT) table, the unit cost report comprises a Phone Bill, and the summary report comprises a Key Indicator Scorecard (KIS).

20. The apparatus of claim 19, wherein the module is further configured to determine employee capacity and volume data based on the business rigor data and storing the capacity and volume data on computer memory.

21. The apparatus of claim 19, wherein the module is further configured to:

periodically receive business rigor data based on the activities to implement the plurality of core products, wherein the activities have been modified based on a review of the summary report;

periodically update the performance table, the unit cost report, and the summary report based on the business rigor data; and present the updated summary report.

22. The apparatus of claim 19, wherein the performance table comprises data based on an analysis of the business rigor data, the unit cost report comprises a cost report based on data in the performance table data, and the summary report comprises a report based on the metrics and performance data in the unit cost report and the performance table.

23. The apparatus of claim 19, wherein the business rigor data is periodically received and the performance table, unit cost report, and summary report are periodically updated based on the business rigor received for each period and the summary report is presented for each period.

24. A computer program product for managing business rigor, the computer program product including a non-transitory computer-readable medium having a computer program residing thereon, the computer program comprising:

instructions for identifying a plurality of core products of a business entity;

instructions for receiving business rigor data based on activities to implement a plurality of core products, wherein the received business rigor data comprises data for core products for at least two lines of business of the business entity, and wherein the business rigor data further comprises at least volume data, efficiency data, business capacity data, and business capability data;

instructions for updating a performance table for the business entity based at least in part on an analysis of the business rigor data, wherein the performance table for the business entity comprises:

a) at least a list view of a plurality of activities performed by a plurality of employees for implementing the plurality of core products;
b) a list view of resource time associated with performing each of the plurality of activities by the plurality of employees required to support each of the plurality of core products,
c) a link for each of the plurality of activities of the plurality of employees to one or more of the plurality of core products, and
d) a value added determination for each of the plurality of activities of the plurality of employees;

instructions for updating a unit cost report based at least in part on the updated performance table for the business entity, wherein the unit cost report comprises at least a view of all costs incurred in supporting each of plurality of core products;

instructions for updating a summary report, wherein the summary report is based at least in part on the updated unit cost report and includes capacity figures for the plurality of employees indicative of the ability to handle current workloads and take on additional work, and wherein the summary report comprises a multiple rolling view of at least one of:

(1) volume trends across different teams in the business entity, and
(2) capability figures to identify how well the business entity is operating in relation to goals and targets;

presenting the unit cost report prior to presenting the summary report; and instructions for presenting the summary report to a user, wherein at least one of:
the performance table comprises a Function, Activity and Time (FAT) table,
the unit cost report comprises a Phone Bill, and
the summary report comprises a Key Indicator Scorecard (KIS).

25. The computer program product of claim 24, wherein the computer program further comprises instructions for determining employee capacity and volume data based on the business rigor data and storing the capacity and volume data on computer memory.

26. The computer program product of claim 24, wherein the computer program further comprises:

instructions for periodically receiving business rigor data based on the activities to implement the plurality of core products, wherein the activities have been modified based on a review of the summary report;
instructions for periodically updating the performance table, the unit cost report, and the summary report based on the business rigor data; and
instructions for presenting the updated summary report.

27. The computer program product of claim 24, wherein the performance table comprises data based on an analysis of the business rigor data, the unit cost report comprises a cost report based on data in the performance table data, and the summary report comprises a report based on the metrics and performance data in the unit cost report and the performance table.

28. The computer program product of claim 24, wherein the instructions allow for the business rigor data to be periodically received and the performance table, the unit cost report, and the summary report to be periodically updated based on the business rigor data received for each period and the summary report is presented for each period.

* * * * *